Dec. 18, 1951 H. B. BELL 2,579,170
METER BOX COVER
Filed Feb. 25, 1949
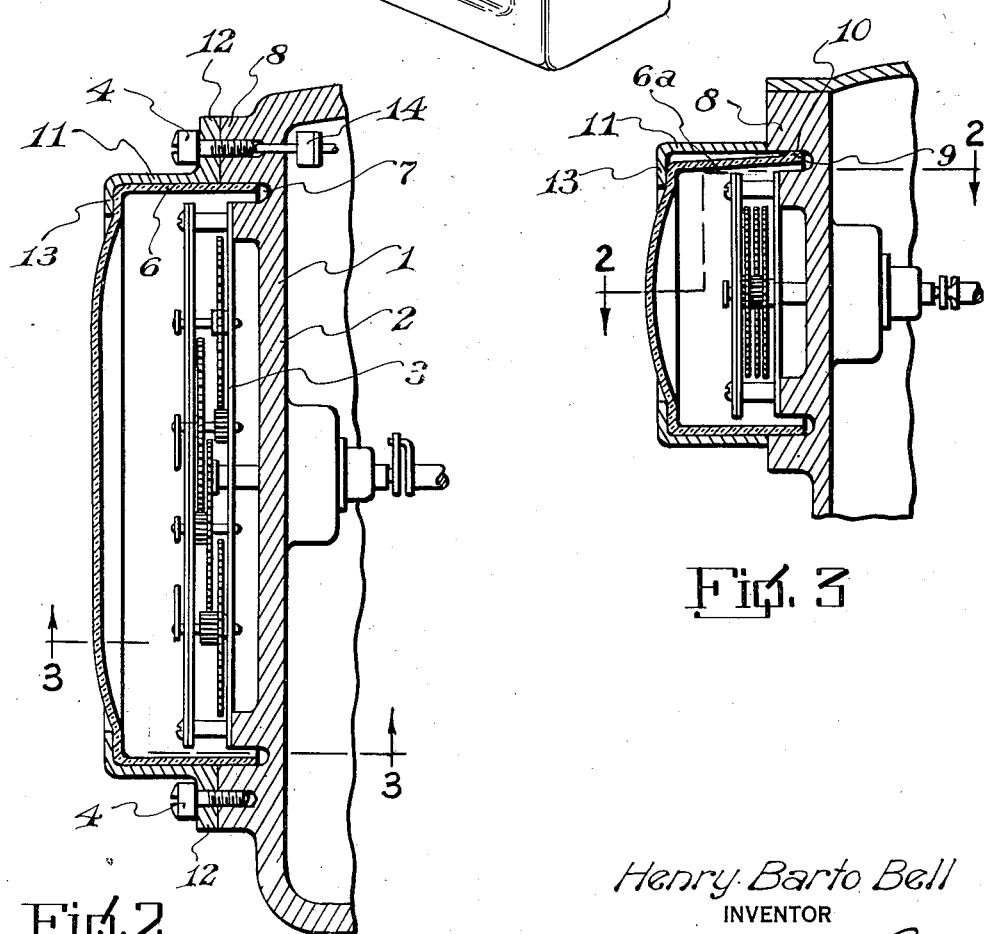
Henry Barto Bell
INVENTOR
ATTORNEY Patented Dec. 18, 1951

2,579,170

UNITED STATES PATENT OFFICE 2,579,170

METER BOX COVER

Henry Barto Bell, Tulsa, Okla.

Application February 25, 1949, Serial No. 78,340

1 Claim. (Cl. 73—431)

The invention relates to covers for meter boxes, for instance electric meters, and has for its object to provide a cover formed of transparent material and held in place on the meter box over the indicating mechanism by a surrounding flanged member bolted to the box, and overlying the outer marginal edges of the cover.

The marginal flange of the cover extends a substantial distance into a channel in the outer face of the meter box and forms means for preventing the insertion of a tool below the cover, for changing the indicating mechanism when the screws are loosened.

A further object is to provide the upper side of the cover with an upwardly and inwardly inclined wall terminating in a rib within the channel of the box for preventing water from being blown into the mechanism. The cover is preferably formed from a transparent flexible material, which will not break when pressed in position by the retaining frame.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the transparent cover.

Figure 2 is a longitudinal sectional view through the meter and cover, taken on line 2—2 of Figure 3.

Figure 3 is a vertical transverse sectional view through the cover and a portion of the meter, taken on line 3—3 of Figure 2.

Referring to the drawing, the numeral 1 designates the meter casing which is generally of conventional form. The outer wall 2 of the casing 1 has mounted thereon the usual indicating mechanism 3, which is read from time to time for billing purposes. In covers, heretofore used, of glass, small insects and dirt get into the indicating mechanism and jam the same. These glass covers are usually held in place by spaced clips, bolted to the meter box by means of bolts 4. The present meter box cover 5 is formed from a transparent plastic material and its marginal flange 6 is received in an endless channel 7, the bottom of which channel is spaced a substantial distance inwardly from the retaining frame seat 8 of the meter box. The upper side 6a, of the cover 5, inclines upwardly and inwardly as shown in Figure 3, and terminates in a longitudinal flange 9, which closely engages the side of the wall 10 of the channel 7, so that moisture or water can not be driven into the indicating mechanism, now a common difficulty. The retaining frame 11, for the cover, is held on the seat 8 by the bolts 4 which extend through the end flanges 12, as shown in Figure 2, and the frame, which as a whole, is closely seated on the seat 8 entirely around the cover. The outer side of the frame 11 is provided with an inwardly extending flange 13, engaging over the outer edge of the cover, and it will be seen when the bolts 4 are tightened, the cover will be securely held in place by the screws 4 so foreign matter can not enter the device. By forming the cover from a plastic transparent material there is no danger of the cover breaking, incident to the clamping operation, as the cover will flex according to the pressure.

It is common practice for unauthorized persons to loosen the screws slightly and insert a tool to change the indicator. It will be noted this is impossible in the present device, as the flanges 6 and 6a extend a substantial distance into the channel 7, equal to or greater than the threaded portion of the screws 4. Unauthorized persons are aware of the fact that the screws 4, if entirely removed, operate theft prevention mechanism, for instance of the type set forth in my Patent Number 2,297,528 issued the 29th day of September, 1942, and controlled by a push member 14, as shown in Figure 2.

From the above it will be seen that a meter cover is provided which is simple in construction, may be applied to meters now in operation, and one wherein foreign matter will be positively excluded from reaching the indicating means housed therein.

The invention having been set forth what is claimed as new and useful is:

The combination with a vertical meter casing wall and an indicating mechanism on the outside of said wall, of a rectangular cover for said indicating mechanism, said cover being formed from a transparent material, inwardly extending side, bottom and top marginal flanges carried by said cover and extending into an endless deep channel in the meter wall around the indicating mechanism, a rectangular shaped cover retaining frame extending around the cover and seated on the outer face of the wall to the outside of the channel, securing bolts extending through said frame and into the outer wall, said frame having an endless flange overlying and engaging the outer side of the cover flanges for forcing the cover into the channel, said top marginal flange inclining upwardly and inwardly into the upper portion of the channel, a longitudinal rib carried by the outer side of the inner edge of the upper flange and engaging the upper wall of the upper portion of the channel, said flange and inclined wall forming means whereby water will be prevented from entering the cover and will flow downwardly and outwardly and be discharged outside of the cover.

HENRY BARTO BELL.

REFERENCES CITED

The following references are of record in the file of this patent:

UNITED STATES PATENTS

| Number | Name | Date |
|---|---|---|
| 1,667,656 | Dilzell | Apr. 24, 1928 |
| 2,413,252 | Smith | Dec. 24, 1946 |

FOREIGN PATENTS

| Number | Country | Date |
|---|---|---|
| 141,079 | Austria | Mar. 25, 1935 |
| 184,922 | Switzerland | Sept. 1, 1936 |
| 571,985 | Germany | Mar. 8, 1933 |